United States Patent [19]

Urban

[11] Patent Number: 5,492,563
[45] Date of Patent: Feb. 20, 1996

[54] FINE DIVISION IN THE PREPARATION OF COPPER PHTHALOCYANINE PIGMENTS

[75] Inventor: Manfred Urban, Wiesbaden, Germany

[73] Assignee: Hoechst AG, Frankfurt, Germany

[21] Appl. No.: 421,627

[22] Filed: Apr. 13, 1995

[30] Foreign Application Priority Data

Apr. 21, 1994 [DE] Germany ............ 44 13 848.2

[51] Int. Cl.⁶ .................................... C09B 47/04
[52] U.S. Cl. ............ 106/412; 106/272; 106/410; 106/411; 106/413; 106/493; 106/494; 540/122; 540/139; 540/144
[58] Field of Search .................. 106/410, 411, 106/412, 413, 493, 494, 272; 540/122, 139, 144

[56] References Cited

U.S. PATENT DOCUMENTS

| | | | |
|---|---|---|---|
| 2,284,685 | 6/1942 | Detrick et al. | 540/122 |
| 2,964,532 | 12/1960 | Klenke, Jr. | 540/141 |
| 3,017,414 | 1/1962 | Minnich | 106/412 |
| 4,024,154 | 5/1977 | Jackson | 540/141 |
| 4,257,951 | 3/1981 | Matrick | 540/141 |
| 5,062,577 | 11/1991 | Schmitt et al. | 241/171 |
| 5,074,918 | 12/1991 | Babler | 106/493 |
| 5,229,508 | 7/1993 | Ikegaya et al. | 106/412 |
| 5,281,268 | 1/1994 | Ide et al. | 106/412 |
| 5,296,033 | 3/1994 | Dietz et al. | 106/412 |
| 5,296,034 | 3/1994 | Dietz et al. | 106/412 |

FOREIGN PATENT DOCUMENTS

| | | |
|---|---|---|
| 1003157 | 1/1977 | Canada . |
| 1073880 | 3/1980 | Canada . |
| 38737 | 10/1981 | European Pat. Off. ............ 106/412 |
| 0069394 | 1/1983 | European Pat. Off. . |
| 0317876 | 5/1989 | European Pat. Off. . |
| 0408499 | 1/1991 | European Pat. Off. . |
| 0574790 | 12/1993 | European Pat. Off. . |
| 0574792 | 12/1993 | European Pat. Off. . |
| 2049225 | 4/1972 | Germany . |
| 2439983 | 7/1977 | Germany . |
| 2256485 | 5/1981 | Germany . |
| 3716587 | 4/1988 | Germany . |
| 58-40333 | 3/1983 | Japan ............................ 106/412 |
| 2211509 | 7/1989 | United Kingdom . |

OTHER PUBLICATIONS

Derwent abstract 81995 D/45 of EP —38–737, Oct. 1981.
Derwent abstract 37566 K/16 of JP 58–040,333, Mar. 1983.
Derwent Abstract 72–25889T/17 of DE2049225 Apr. 1972.

Primary Examiner—Mark L. Bell
Assistant Examiner—Scott L. Hertzog
Attorney, Agent, or Firm—Connolly & Hutz

[57] ABSTRACT

Copper phthalocyanine pigments are finely divided in an ecologically and economically advantageous manner by first of all subjecting crude, coarsely crystalline copper phthalocyanine pigments to dry milling and then wet milling the finely divided prepigments which are obtained in the course of dry milling, in aqueous suspension and with the addition of from 0.1 to 5% by weight, based on the total millbase, of an organic solvent which is inert with respect to the process conditions, on a stirred ball mill which is operated at an energy density of more than 2.5 kW per liter of milling space and a peripheral stirrer speed of more than 12 m/s under the action of grinding media having a diameter of less than or equal to 1 mm. Copper phthalocyanine pigments prepared in this way are particularly suitable as colorants for pigmenting paints, printing inks and plastics.

16 Claims, No Drawings

FINE DIVISION IN THE PREPARATION OF COPPER PHTHALOCYANINE PIGMENTS

DESCRIPTION

The present invention is in the field of copper phthalocyanine pigments. Copper phthalocyanine pigments are used as colorants for pigmenting high molecular weight materials such as coatings, printing inks and plastics.

Phthalocyanine pigments have been known for a long time. They are prepared by fine division and finishing of the crude, coarsely crystalline pigments obtained in the synthesis. Examples of such fine-division and finishing processes are acid pasting, dry milling and wet milling. Combinations of these processes are also described. In order to improve purity and shade it is in some instances necessary to purify the crude pigments prior to fine division, for example by recrystallization with sulfuric acid.

The conversion of crude, coarsely crystalline pigments to the pigment form is described in the documents listed below:

U.S. Pat. No. 4,257,951 describes a two-stage dry- and wet-milling process for the preparation of copper phthalocyanine pigments. In this process inorganic salts pass into the waste water and require reprocessing. For this reason this process is uneconomical. Furthermore, it is described therein that suitable pigments are not obtained if the salt and the solvent are left out at the dry milling stage.

U.S. Pat. No. 4,024,154 likewise describes a two-stage dry- and wet-milling process for the preparation of copper phthalocyanine pigments. In this process the crude, coarsely crystalline pigments are subjected to dry premilling in a rolling mill and are then wet-milled in a rolling mill in the presence of small quantities of an aliphatic hydrocarbon and inorganic salts. This process is uneconomic because of the extremely long milling times at the wet milling stage. Moreover, inorganic salts and acids pass into the waste water and require reprocessing.

U.S. Pat. No. 5,074,918 describes a process for conditioning of organic pigments by dry milling of the crude, coarsely crystalline pigments with the addition of salt, or wet milling of the crude, coarsely crystalline pigments without the addition of salt, in each case in the presence of micronized waxes. In the case of dry milling with the addition of salt, large quantities of salt pass into the waste water, making this procedure expensive and ecologically unsound. Under the indicated conditions of the wet milling, however, it is not possible to prepare transparent copper phthalocyanine pigments of good color strength for the plastics sector from crude, highly crystalline copper phthalocyanine pigments.

The use of waxes to improve the performance properties in plastics is described in DE-A-2 049 225. Readily dispersible pigments for use in thermoplastics are prepared by mixing the pigments with wax dispersions in mixers or edge runner mills.

Processes which make it possible to prepare copper phthalocyanine pigments of good color strength and ready dispersibility in an environment-friendly manner and without the production of polluting waste waters, with small quantities of organic solvents, have not hitherto been disclosed.

U.S. Pat. No. 5,296,034 describes a process for the preparation of copper phthalocyanine pigment preparations of the α-phase which are prepared by phase conversion from crude copper phthalocyanine pigments of the β-phase, by carrying out wet milling of the abovementioned β-modification without a dry milling step. A similar process is described in U.S. Pat. No. 5,296,033 but is carried out under phase-retaining conditions. The phthalocyanine pigments which result from the two processes specified, however, leave much to be desired with regard to their color strength and dispersibility in plastics. Moreover, large quantities of solvent are employed which have to be regenerated.

The object of the present invention was to provide a process for the fine division of crude copper phthalocyanine pigments which avoids, in particular, the ecological and economic disadvantages of previously disclosed processes of fine division for crude copper phthalocyanine pigments and which gives good performance properties of copper phthalocyanine pigments, especially in plastics.

It has surprisingly been found that copper phthalocyanine pigments of good color strength and ready dispersibility can be prepared in an economical and environment-friendly way by dry milling the crude copper phthalocyanine pigments which are obtained in coarsely crystalline form in the purification or in the synthesis, if desired in the presence of milling auxiliaries, and subjecting the finely divided, usually heavily agglomerated prepigments which are obtained in this dry milling to wet milling in the presence of small quantities of organic solvents, and then isolating them.

The present invention relates to a process for the fine division of crude copper phthalocyanine pigments, which comprises first of all subjecting crude, coarsely crystalline copper phthalocyanine pigments to dry milling and then wet milling the finely divided prepigments, which are obtained in the course of dry milling, in aqueous suspension and with the addition of from 0.1 to 5% by weight, based on the total millbase, of an organic solvent which is inert with respect to the process conditions, on a stirred ball mill which is operated at an energy density of more than 2.5 kW per liter of milling space and a peripheral stirrer speed of more than 12 m/s under the action of grinding media having a diameter of less than or equal to 1 mm.

For the dry milling it is advantageous to employ the crude pigments which are obtained in the synthesis, for example according to CA-A-1 003 157 and U.S. Pat. No. 2,964,532, or the crude, highly crystalline copper phthalocyanine pigments of the α- or β-phase which are obtained after the sulfuric acid purification in accordance with CA-A-1,073,880 and U.S. Pat. No. 2,284,685, which pigments are unsubstituted or contain 1 to 4 sulfo or carboxyl groups in the molecule. As crude pigments it is also possible to employ copper phthalocyanines which are halogen-free or contain 1 to 15 chlorine atoms and/or 1 to 12 bromine atoms. Mixtures of the abovementioned crude pigments can also be employed.

Preliminary experiments are necessary in order to determine the optimum milling conditions. Critical factors of the physical condition of the crude pigments are the purity, the crystal size, the crystal quality and the crystal modification. In general it is necessary to mill pure and highly crystalline crude pigments for a longer duration than impure pigments whose crystal lattice is disturbed.

In a preferred embodiment of the process of the invention, at least one of the additives mentioned below is added prior to dry milling as a milling auxiliary preferably a wax. All known waxes and mixtures thereof, especially acid waxes, ester waxes, amide waxes, hydrocarbon waxes and polyolefin waxes, are of interest. They are preferably employed in a quantity of from 0.1 to 10% by weight, especially from 2.5 to 7.5% by weight, based on the crude pigment employed.

The waxes can be added all at once or in two or more portions. The waxes can remain in the pigment after milling.

Dry milling is carried out in a discontinuous or continuous vibrating mill or rolling mill under mild milling conditions, which are defined below, and preferably with a low millbase charge. The millbase charge is defined as the ratio of the quantity of millbase (crude pigment and, if desired, additive) to the free volume of the bed of grinding media (only the grinding media). The millbase charge is normally less than 250 g of millbase per liter of free volume of the bed of grinding media, preferably from 50 to 150 g/l. The millbase charge may be even higher, but then technical problems may occur and in many cases the desired colorant properties are not attained.

Milling in a vibrating mill takes place with the grinding media performing essentially only rotating motions, and their kinetic energy is minimized by the selection of mass and size and by means of the frequency and amplitude. Moreover, the mill is operated with a high proportion of grinding media. The grinding charge, defined as the ratio of the volume of the bed of grinding media to the mill volume, is more than 60% by volume.

Milling on a rolling mill is carried out at a grinding charge of from 40 to 60% by volume and advantageously at from 65 to 75% of the critical frequency. The kinetic energy is minimized by selecting the mass and size of the grinding media. In this case too the mill is preferably operated with a low millbase charge.

The grinding media used for rolling-mill or vibrating-mill milling are balls or cylinders of steel, corundum, porcelain, steatite, alumina, mixed oxides and quartz having a diameter of from 3 to 20 mm. The grinding media specified should have a pore-free surface which is as smooth as possible. The milling temperature is generally below 100° C. The duration of milling depends on the required fineness of the pigment. The residence time of the millbase in a vibrating mill is in general, depending on the fineness required, between 1 and 25 hours. A duration of from 1 to 15 hours is advantageous, preferably from 2 to 8 hours. The residence time of the millbase in a rolling mill is in general, depending on the fineness required, between 5 and 100 hours. A duration of from 10 to 30 hours is advantageous, preferably from 15 to 25 hours.

In addition to the abovementioned components the millbase may also contain further conventional additives, for example small quantities (up to about 5% by weight) of water, pigment dispersing agents based on pigments, resins, salts of resins and extenders. The additives may also be employed in emulsified, suspended and liquid form, since pulverulent substances may take up small quantities (up to about 5% by weight) of liquid without immediately losing their property of pulverulence. Small quantities of inorganic salts may be added to reduce the danger of a dust explosion. It is particularly advantageous to use additives which are able to remain in the pigment after milling. The salts of the fatty acids and resins may be converted after milling into the free acids or resins.

The additives can be added before, during or after dry milling, but also during or after wet milling or during or after isolation—in the latter case also by dry mixing. The most suitable point in time must be determined beforehand by guideline experiments. Since agglomeration processes take place when dry milling, even in the presence of milling assistants, in addition to the desired comminution of the coarsely crystalline particles of crude pigment, dry milling is followed by wet milling in order to disperse the agglomerated millbase.

For the wet milling, all discontinuous and continuous stirred ball mills are suitable. In this context, a high milling action is necessary. This is achieved by employing a specific embodiment of the stirred ball mill. Stirred ball mills which are particularly suitable for milling to the desired efficiency are those which are designed for batchwise and continuous operation, which have a cylindrical or hollow-cylindrical milling space in horizontal or vertical construction and which can be operated at a specific power density of more than 2.5 kW per liter of milling space, and whose peripheral stirrer speed is more than 12 m/s.

Mills of this kind are described in, for example, DE-A 3,716,587 (U.S. Pat. No. 5,062,577). The energy output per unit time by the stirrer mechanism is transmitted to the millbase as disruption energy and as frictional energy in the form of heat. In order to dissipate this large quantity of heat without problems it is necessary to take constructional measures to keep the ratio of milling space to milling-space surface area (cooling area) as low as possible. With milling carried out in circulation at high throughputs, the heat can be dissipated to the outside predominantly via the millbase. Examples of the grinding media used are balls of zirconium oxide, zirconium mixed oxide, aluminum oxide or quartz with a diameter of less than 1 mm; it is advantageous to use grinding media having a diameter of from 0.2 to 0.8 mm, preferably from 0.3 to 0.5 mm.

When continuous stirred ball mills are used for fine division, the grinding media are separated from the millbase preferably by centrifugation, so that there is virtually no contact between the separation devices and the grinding media, thus making it possible to a large extent to prevent the separation devices from becoming blocked. In this case the stirred ball mills are operated with a high grinding charge. In the case of the continuous stirred ball mills the milling space is filled almost completely with grinding media.

Preliminary experiments are necessary in order to determine the appropriate milling conditions. Milling is carried out in an aqueous medium with the addition of from 0.1 to 5% by weight of an organic solvent, based on the overall millbase, in a homogeneous mixture. In this case the quantity of solvent added is only that which is required for phase retention or phase conversion. The milling is preferably carried out in the neutral or alkaline pH range.

The concentration of prepigment in the millbase at the wet milling stage is dependent on the theology of the suspension and is advantageously not more than 40% by weight, preferably from 5 to 35% by weight and, in particular, from 10 to 20% by weight, of the millbase suspension.

Suitable organic solvents which can be added with advantage to the millbase suspension are: water-miscible $C_1$–$C_8$ alkanols such as methanol, ethanol, n-propanol, isopropanol, n-butanol, tert-butanol, isobutanol, pentanol, hexanol or alkylhexanols; cyclic alkanols such as cyclohexanol; $C_1$–$C_5$ dialkyl ketones such as acetone, diethyl ketone, methyl isobutyl ketone or methyl ethyl ketone; ethers and glycol ethers such as tetrahydrofuran, dimethoxyethane, methylglycol, ethylglycol, butylglycol, ethyldiglycol, methoxypropanol or methoxybutanol; aliphatic carboxamides such as formamide or dimethylformamide; cyclic carboxamides such as N-methylpyrrolidone, valerolactam or caprolactam, or mixtures of the abovementioned solvents with water. Solvents used for pigments of the β-phase are aromatic hydrocarbons such as toluene, xylenes or ethylbenzenes aromatic halogenated hydrocarbons such as chlorobenzene, o-dichlorobenzene, 1,2,4-trichlorobenzene or bromobenzene, and substituted aromatic compounds, such as nitrobenzene or phenol.

The wet milling is carried out at temperatures in the range from 0° to 100° C., advantageously at a temperature of between 10° and 60° C. and preferably at from 20° to 50° C.

The duration of wet milling depends on the required fineness of the pigment. The residence time of the millbase in the stirred ball mill, depending on the required fineness, is in general between 5 and 60 minutes. An advantageous duration is one of 5 to 45 minutes, preferably 10 to 30 minutes.

The finely divided pigments obtained after wet milling are isolated either directly or after the solvent has been separated off. The term isolation commonly refers to the removal of the solvent by distillation, filtration, washing of the filter cake, and subsequent drying of the pigments.

By choosing the organic solvent, the wax and the additives, the concentrations thereof, the temperature and the pH it is possible, depending on the desired application, to prepare copper phthalocyanine pigments which possess either a greater transparency or a better opacity. They are particularly suitable for the pigmentation of plastics, paints and printing inks.

The preparation of copper phthalocyanine pigments by the process according to the invention has proven particularly economical and environment-friendly, since the fine division of the crude pigments by salt-free dry milling followed by wet milling does not give rise to any pollution of the waste waters by salts or acids. Moreover, only very small quantities of the abovementioned additives and solvents are employed, which can subsequently be reprocessed or completely regenerated, with the result that there are no overall waste disposal problems. An additional solvent finish is not absolutely necessary but can be carried out with the small quantity of organic solvent which is present.

The pigments which can be obtained in accordance with the present invention are distinguished by their outstanding coloring properties, especially their dispersibility, transparency, color strength and purity of shade.

The pigments prepared in accordance with the invention can be employed, in particular, for pigmenting high molecular weight organic materials of natural or synthetic origin, examples being cellulose ethers and cellulose esters, such as ethylcellulose, nitrocellulose, cellulose acetate or cellulose butyrate, natural resins or synthetic resins such as addition polymerization resins or condensation resins, for example amino resins, especially urea- and melamine-formaldehyde resins, alkyd resins, acrylic resins, phenolic resins, polycarbonates, polyolefins such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

In this context it is unimportant whether the abovementioned high molecular weight organic compounds are in the form of plastic masses or melts or in the form of spinning solutions, especially of polypropylene, or of lacquers, coating materials or printing inks. Depending on the intended application it may prove advantageous to use the pigments obtained in accordance with the invention as toners or in the form of preparations or dispersions. Based on the high molecular weight organic material to be pigmented, the pigments prepared in accordance with the invention are employed in a quantity of from 0.1 to 10% by weight. The pigments prepared in accordance with the invention can be readily dispersed in numerous application media to high degrees of fineness.

These pigments can be used for coloring plastics with high color strength and high transparency.

To evaluate the properties in the plastics sector of pigments prepared according to the present invention a selection was made, from the large number of known plastics, of plasticized polyvinyl chloride (PVC). The bleed fastness was determined in accordance with DIN 53775.

To evaluate the properties in the paint sector of the pigments prepared in accordance with the invention a selection was made, from the large number of known lacquers, of an alkyd-melamine resin lacquer (AM) containing aromatic components and based on a medium-oil nondrying alkyd resin composed of synthetic fatty acids and phthalic anhydride and of a butanol-etherified melamine resin and proportions of a nondrying alkyd resin based on ricinoleic acid (short-oil). The color strength and color were determined in accordance with DIN 55986.

The crystal phase of the crude pigments, prepigments and pigments was determined by X-ray spectroscopy. The X-ray spectra were recorded using CuKα radiation.

In the examples which follow, parts and percentages of the substances described are by weight. CuPc denotes copper phthalocyanine.

EXAMPLE 1

30 parts of crude, coarsely crystalline CuPc pigment (β-phase) and 1.5 parts of polyolefin wax (m.p.: 104° C., molecular mass 2000) are introduced into a plastics container filled to 80% of its volume with 1400 parts of steatite cylinders of diameter 12 mm and length 12 mm as grinding media. Fine milling is carried out for 4 hours with agitation on a vibrating mill (Vibratom type; manufacturer: Siebtechnik Mühlheim) at 1400 revolutions per minute, circular vibration 4 mm. The millbase is then screened to remove the grinding media.

A suspension consisting of 89 parts of water, 1 part of xylene and 10 parts of the prepigment obtained from the vibration milling, which is a mixture of α- and β-phase, is metered into a stirred ball mill (manufacturer: Draiswerke GmbH, Mannheim) filled with 336 parts of zirconium mixed-oxide beads of diameter 0.3 to 0.4 mm as grinding media and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, and the millbase suspensions are combined. The xylene is then distilled off using steam and the pigment is filtered off with suction, washed with water and dried at 80° C.

9.5 parts of CuPc pigment (β-phase) are obtained which is very readily dispersible in the plastic (PVC) and gives transparent colorations of high color strength. The bleed fastness is faultless. Transparent coatings of high color strength are obtained in the AM lacquer.

EXAMPLE 2

30 parts of crude, coarsely crystalline CuPc pigment (β-phase) and 1.5 parts of polyolefin wax (m.p.: 104° C., molecular mass 2000) are introduced into a plastics container filled to 55% of its volume with 2300 parts of steel balls of diameter 10 mm as grinding media. Milling is carried out for 24 hours at 75% of the critical frequency on a roller gear table. The millbase is subsequently screened to remove the grinding media.

A suspension consisting of 89.5 parts of water, 0.5 part of chlorobenzene and 10 parts of the prepigment obtained from the roll milling, which is a mixture of α- and β-phase, is metered into a stirred ball mill (manufacturer: Draiswerke GmbH, Mannheim) filled with 336 parts of zirconium mixed-oxide beads of diameter 0.3 to 0.4 mm as grinding media and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, and the millbase suspensions are combined. The chlorobenzene is then distilled off using steam and the pigment is filtered off with suction, washed with water and dried at 80° C.

9.5 parts of CuPc pigment (β-phase) are obtained which is very readily dispersible in the plastic (PVC) and gives transparent colorations of high color strength. The bleed fastness is faultless.

EXAMPLE 3

30 parts of crude, coarsely crystalline CuPc pigment (β-phase) and 1.5 parts of polyolefin wax (m.p.: 104° C., molecular mass 2000) are introduced into a plastics container filled to 80% of its volume with 1400 parts of steatite cylinders of diameter 12 mm and length 12 mm as grinding media. Fine milling is carried out for 4 hours with agitation on a vibrating mill (Vibratom type; manufacturer: Siebtechnik Mühlheim) at 1400 revolutions per minute, circular vibration 4 mm. The millbase is then screened to remove the grinding media.

A suspension consisting of 85 parts of water, 5 parts of methyl ethyl ketone and 10 parts of the prepigment obtained from the vibration milling, which is a mixture of α- and β-phase, is metered into a stirred ball mill (manufacturer: Draiswerke GmbH, Mannheim) filled with 336 parts of zirconium mixed-oxide beads of diameter 0.3 to 0.4 mm as grinding media and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, and the millbase suspensions are combined and filtered with suction, and pigment filtered off is washed with water and dried at 80° C.

9.5 parts of CuPc pigment (predominantly a-phase) are obtained which is very readily dispersible in the plastic (PVC) and gives transparent colorations of high color strength.

EXAMPLE 4

30 parts of crude, coarsely crystalline CuPc pigment α-phase and 1.5 parts of polyolefin wax (m.p.: 104° C., molecular mass 2000) are introduced into a plastics container filled to 55% of its volume with 2300 parts of steel balls of diameter 10 mm as grinding media. Milling is carried out for 24 hours at 75% of the critical frequency on a roller gear table. The millbase is subsequently screened to remove the grinding media.

A suspension consisting of 85 parts of water, 5 parts of methyl ethyl ketone and 10 parts of the prepigment obtained from the roll milling, which is in the α-phase, is metered into a stirred ball mill (manufacturer: Draiswerke GmbH, Mannheim) filled with 336 parts of zirconium mixed-oxide beads of diameter 0.3 to 0.4 mm as grinding media and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, and the millbase suspensions are combined and filtered with suction, and the pigment filtered off is washed with water and dried at 80° C.

9.4 parts of CuPc pigment (α-phase) are obtained which is very readily dispersible in the plastic (PVC) and gives transparent colorations of high color strength.

EXAMPLE 5

30 parts of crude, coarsely crystalline CuPc pigment α-phase, with a chlorine content of 3.4% by weight) and 1.5 parts of polyolefin wax (m.p.: 104° C., molecular mass 2000) are introduced into a plastics container filled to 55% of its volume with 2300 parts of steel balls of diameter 10 mm as grinding media. Milling is carried out for 24 hours at 75% of the critical frequency on a roller gear table. The millbase is subsequently screened to remove the grinding media.

A suspension consisting of 85 parts of water, 5 parts of isobutanol and 10 parts of the prepigment obtained from the roll milling, which is in the α-phase, is metered into a stirred ball mill (manufacturer: Draiswerke GmbH, Mannheim) filled with 336 parts of zirconium mixed-oxide beads of diameter 0.3 to 0.4 mm as grinding media and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, and the millbase suspensions are combined. The isobutanol is then distilled off at up to 100° C. and the pigment is filtered off with suction, washed with water and dried at 80° C.

9.6 parts of CuPc pigment (α-phase, with a chlorine content of 3.4% by weight) are obtained which is very readily dispersible in the plastic (PVC) and gives transparent colorations of high color strength.

I claim:

1. A process for the fine division of crude copper phthalocyanine pigments, which comprises first of all subjecting crude, coarsely crystalline copper phthalocyanine pigments to dry milling in the presence of a wax as a milling assistant and then wet milling the finely divided prepigments, which are obtained in the course of dry milling, in aqueous suspension and with the addition of from 0.1 to 5% by weight, based on the total millbase, of an organic solvent which is inert with respect to the process conditions, on a stirred ball mill which is operated at an energy density of more than 2.5 kW per liter of milling space and a peripheral stirrer speed of more than 12 m/s under the action of grinding media having a diameter of less than or equal to 1 mm.

2. The process as claimed in claim 1, wherein the milling assistant is added in a quantity of from 0.1 to 10% by weight, based on the crude, coarsely crystalline pigment.

3. The process as claimed in claim 1, wherein the milling assistant is added in a quantity of from 2.5 to 7.5% by weight, based on the crude, coarsely crystalline pigment.

4. The process as claimed in claim 1, wherein the dry milling is carried out with a millbase charge of less than 250 g of millbase per liter of free volume of the bed of grinding media.

5. The process as claimed in claim 1, wherein the dry milling is carried out with a millbase charge of from 50 to 150 g of millbase per liter of free volume of the bed of grinding media.

6. The process as claimed in claim 1, wherein the dry milling is carried out in a vibrating mill with a grinding charge of more than 60% by volume.

7. The process as claimed in claim 1, wherein the dry milling is carried out in a rolling mill with a grinding charge of from 40 to 60% by volume.

8. The process as claimed in claim 1, wherein grinding media of diameter 3 to 20 mm are used for the dry milling.

9. The process as claimed in claim 1, wherein grinding media of diameter 0.2 to 0.8 mm are employed for the wet milling.

10. The process as claimed in claim 1, wherein grinding media of diameter from 0.3 to 0.5 mm are employed for the wet milling.

11. The process as claimed in claim 1, wherein the concentration of prepigment in the millbase at the wet milling stage is from 5 to 35% by weight.

12. The process as claimed in claim 1, wherein the concentration of prepigment in the millbase at the wet milling stage is from 10 to 20% by weight.

13. The process as claimed in claim 1, wherein one or more crude, coarsely crystalline copper phthalocyanine pigments of the α- or β-phase are employed which are unsubstituted or which contain 1 to 4 radicals selected from the group consisting of sulfo and carboxy, 1 to 15 chlorine atoms, 1 to 12 bromine atoms or a combination of said radicals and atoms.

14. A method of pigmenting paints, printing inks and plastics comprising the step of incorporating a pigment prepared as claimed in claim 1 into the paints, printing inks and plastics.

15. The method as claimed in claim 14, wherein the plastics are in the form of plastic masses, melts or spinning solutions.

16. The method as claimed in claim 14, wherein the plastics are cellulose ethers or cellulose esters, natural resins, addition polymerization resins or condensation resins, amino resins, alkyd resins, acrylic resins, phenolic resins, polycarbonates, polyolefins, polyvinyl chloride, polyacrylonitrile, polyacrylates, polyamides, polyurethanes or polyesters, rubber, casein, silicone or silicone resins, or mixtures thereof.

* * * * *